Aug. 18, 1953     G. W. SCHNETZER, JR     2,649,018
CONTROL MECHANISM FOR PHOTOGRAPHIC COPYING APPARATUS
Filed Oct. 17, 1951     5 Sheets-Sheet 1
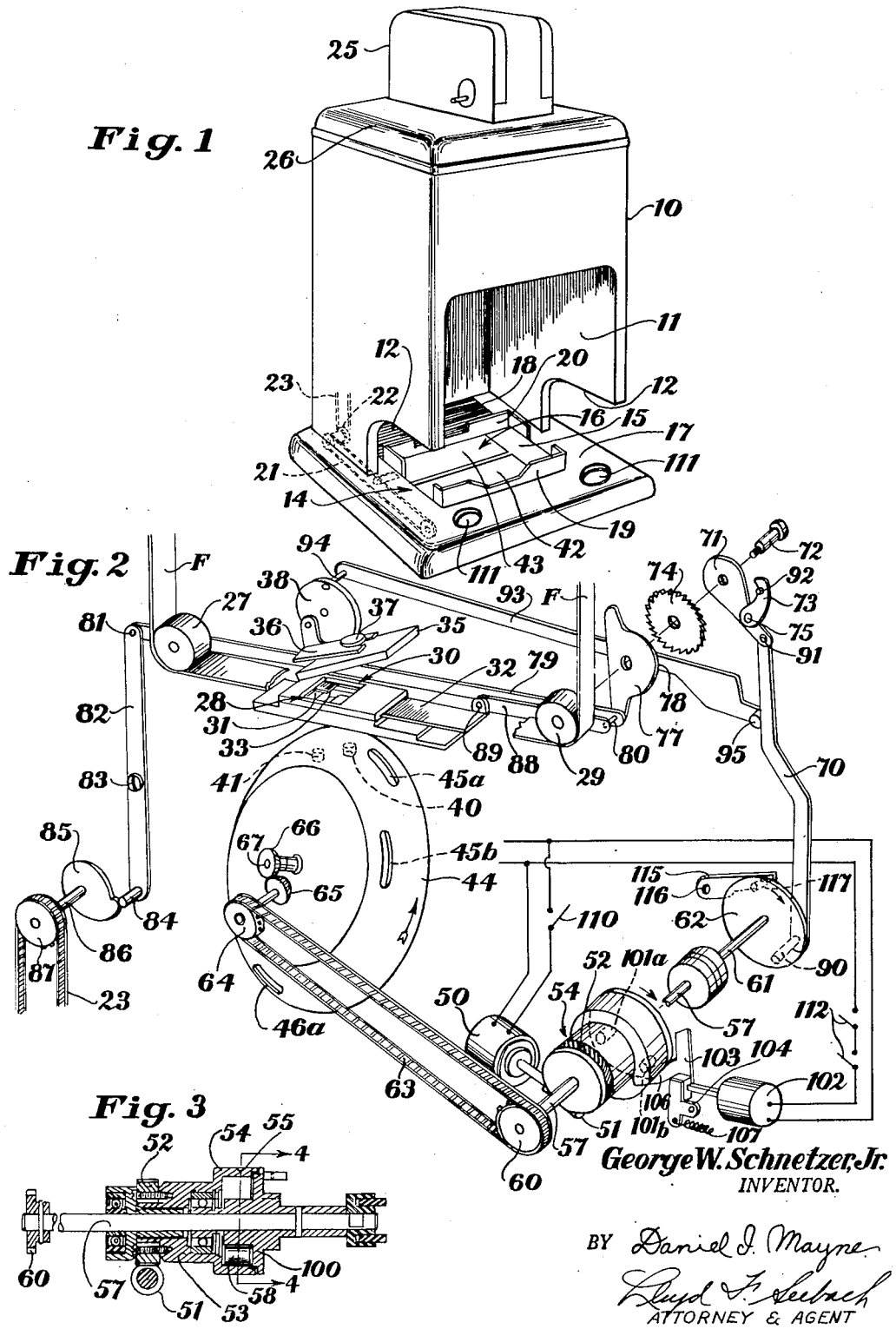
George W. Schnetzer, Jr.
INVENTOR.
BY Daniel I. Mayne
Lloyd F. Seebach
ATTORNEY & AGENT Aug. 18, 1953     G. W. SCHNETZER, JR     2,649,018
CONTROL MECHANISM FOR PHOTOGRAPHIC COPYING APPARATUS
Filed Oct. 17, 1951     5 Sheets-Sheet 2

George W. Schnetzer, Jr.
INVENTOR.

BY Daniel I. Mayne
Lloyd F. Seebach
ATTORNEY & AGENT

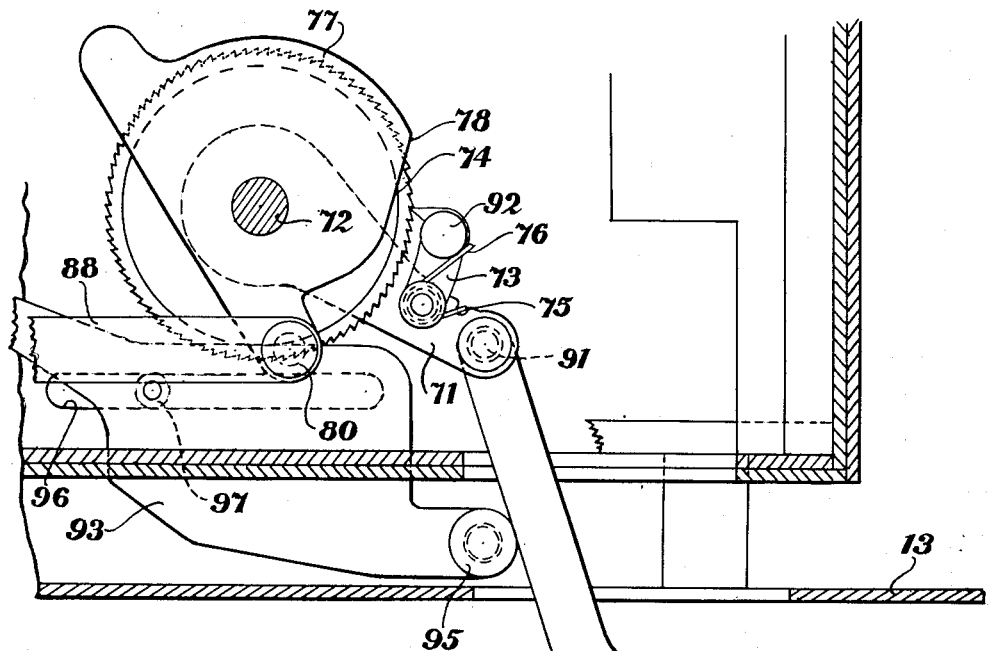
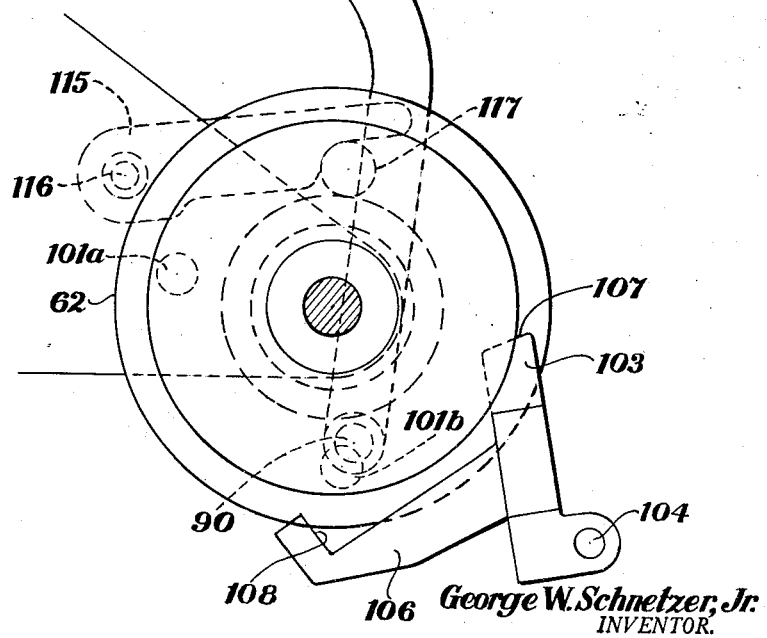
Fig. 6

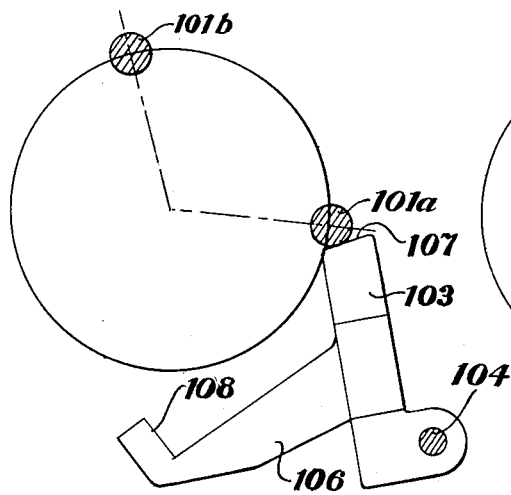
Fig. 8
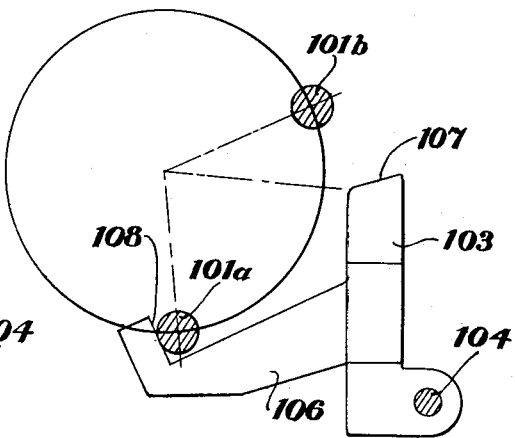
Fig. 9
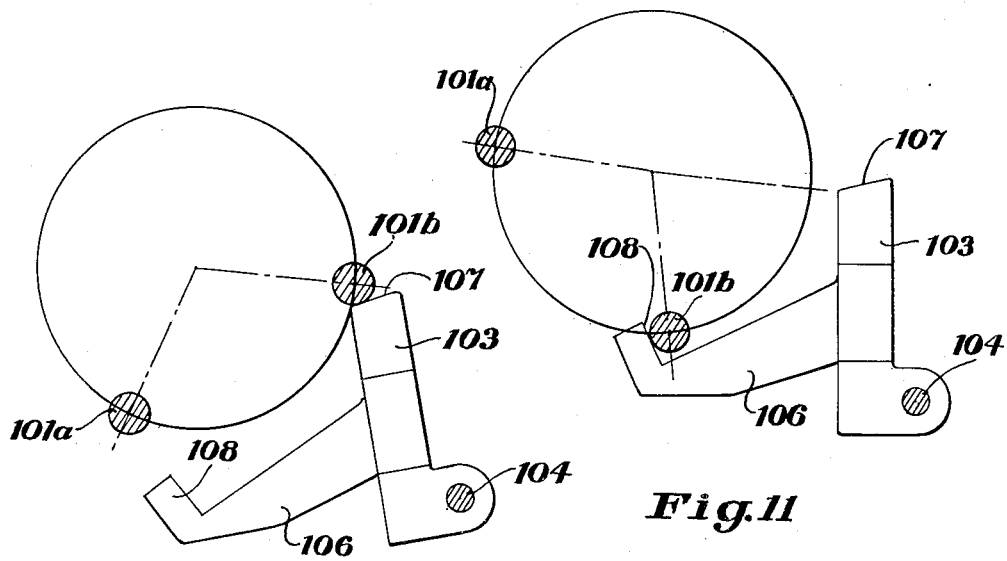
Fig. 10
Fig. 11
George W. Schnetzer, Jr.
INVENTOR.

George W. Schnetzer, Jr.
INVENTOR.

BY Daniel J. Mayne
Lloyd F. Aubach
ATTORNEY & AGENT

Patented Aug. 18, 1953

2,649,018

UNITED STATES PATENT OFFICE 2,649,018

CONTROL MECHANISM FOR PHOTOGRAPHIC COPYING APPARATUS

George W. Schnetzer, Jr., Rochester, N. Y., assignor to Eastman Kodak Company, Rochester, N. Y., a corporation of New Jersey Application October 17, 1951, Serial No. 251,700

9 Claims. (Cl. 88—24)

This invention relates to photographic copying apparatus and more particularly to a control mechanism for providing a cycle of operation in which the light-sensitive material is advanced only after an exposure of different aspects of several documents is made through each of two mutually offset objectives.

In many of the present installations of photographic equipment for recording checks, documents, or the like, both sides of a document are photographed simultaneously. This is accomplished by moving the document between two angularly disposed mirrors so that the images of the obverse and reverse sides of the document are imaged in spaced-apart relation transversely of the light-sensitive material. However, in instances where a fully automatic machine is not warranted, manually operable machines have been devised for photographing each document separately by placing it in a copy plane and making an exposure, the images of the documents being spaced longitudinally of the light-sensitive material. Such a combination copying and projection machine is disclosed in U. S. Patents Nos. 2,180,007 and 2,213,734, issued to R. S. Hopkins on November 19, 1939, and September 3, 1940, respectively. In banking establishments, an advantage is found in having the obverse and reverse sides of the same document arranged transversely of the light-sensitive material, since this arrangement permits easier comparison and a larger number of images to be projected onto the screen. Also, the projected image of each check is complete, that is, both images appear side by side on the screen so that in comparing any group of checks on the screen it is not necessary for the operator to move the light-sensitive material. When the images are arranged longitudinally, the second image of the document or check appearing near the top or bottom of the screen may not be in view unless the light-sensitive material is moved a small amount in one direction or the other.

To accomplish this result of photographically recording documents or checks in a manually-operable apparatus so that the images of the obverse and reverse side of the same document are spaced transversely of the light-sensitive material or film, a pair of objectives are mutually offset both laterally and longitudinally with respect to the film strip. The documents are arranged in a stack in the copy plane with the obverse sides or faces upward. After an exposure the uppermost check is turned over and placed adjacent the first stack to form a second stack with the reverse side or back of the check uppermost. After each exposure, this turning and transfer of the uppermost check to the second stack is performed manually so that a different aspect of said checks is presented for each exposure. A shutter provided with exposure apertures which are spaced laterally in accordance with the spacing of the objectives and also spaced in the direction of movement permits an exposure to be made through each of said objectives. Accordingly, the obverse side of one check and the reverse side of another check are imaged by each objectives in an area of the film strip which is displaced laterally by a distance substantially equal to the width of said area and which is displaced longitudinally by a distance substantially equal to one-half of the length of said area so that the images of the obverse and reverse sides of the same document or check are adjacent transversely of the film strip. The film strip is advanced to move an unexposed area into position only after an exposure has been made through each of said objectives. In order to provide an interval between each exposure for turning and transferring each check and an interval for advancement of the film strip, a control or escapement means has been provided. The escapement means is associated with the clutch means to control movement of the film advancing means and the shutter drive to provide a cycle of operation for each revolution of the driven member of the clutch means in which an exposure is made through each objective and the film strip is advanced only after exposures have been made through each of said objectives. Since the different aspects are imaged alternately through said objectives, the images of the obverse and reverse sides of successive documents or checks are oppositely arranged transversely of the film strip, but such an arrangement does not impair the efficiency of the operator in making satisfactory visual comparisons of the checks.

The primary object of the invention, therefore, is to provide a photographic copying apparatus in which the obverse side of one document and the reverse side of a second document can be simultaneously photographed and the images are collocated so that the two sides of the same document are arranged in spaced-apart relation transversely of the light-sensitive material.

Another object of the invention is to provide a photographic copying apparatus in which an escapement mechanism controls the exposure of different aspects of the documents and the advancement of the light-sensitive material.

Yet another object of the invention is to provide a photographic copying apparatus in which an escapement mechanism is associated with the clutch means connecting the drive means to the advancing means for the light-sensitive material and the shutter drive means for providing a cycle of operation for each revolution of the clutch means.

Still another object of the invention is to provide a photographic copying apparatus in which the obverse and reverse sides of different documents arranged in contiguous stacks are photographed simultaneously through one of two mutually offset objectives and an escapement means associated with a clutch means controls a cycle of operation for each revolution of the clutch means including exposure through each objective and advancement of the light-sensitive material.

And yet another object of the invention is to provide a photographic copying apparatus in which the obverse and reverse sides of different documents arranged in contiguous stacks for presenting different aspects are photographed simultaneously through one of two mutually offset objectives for imaging said different aspects in successive displaced areas of the light-sensitive material, and an escapement means associated with a clutch means controls a cycle of operation for each revolution of the clutch means including exposure through each objective and advancement of the light-sensitive material only after exposure of different aspects have been made through each objective.

These and other objects and advantages will be apparent to those skilled in the art by the description which follows.

The objects of the invention are embodied in a photographic copying apparatus having a photographic field and an exposure station for simultaneously recording the obverse side of one document and the reverse side of a second document. A copy holder is arranged in the photographic field for supporting a plurality of documents which are arranged thereon in contiguous stacks for presenting a series of different aspects. The light-sensitive material is supported in the exposure station by a gate member. Two objectives are arranged with respect to the light-sensitive material for imaging the different aspects of the documents on successive displaced areas of said light-sensitive material, the areas being displaced laterally by a distance substantially equal to the width of an area and longitudinally by a distance substantially equal to one-half the length of an area so that the images of the obverse and reverse sides of each document are adjacent transversely of the light-sensitive material. A shutter is provided with apertures for cooperating with the objectives to make exposures of the different aspects, and an advancing means intermittently advances the light-sensitive material. A clutch connects the drive means to the shutter drive and the advancing means through its driven member. A cycle of operation for each revolution of the clutch is controlled by an escapement means associated with the driven member of the clutch, said cycle including exposure through each objective and advancement of said light-sensitive material after exposures of different aspects have been made through each of said objectives.

Reference is now made to the accompanying drawings wherein like reference numerals designate like parts and wherein:

Fig. 1 is a perspective view of a photographic copying apparatus in which the present invention has been incorporated;

Fig. 2 is a diagrammatic perspective view of the arrangement of the various elements comprising a preferred embodiment of the invention;

Fig. 3 is a vertical section through the clutch means for driving the shutter and the film advancing means;

Fig. 6 is a partial side elevation of the advancing means for the light-sensitive material and showing the relation of other elements operatively connected thereto;

Figs. 8–11 are schematic views showing various relations of the stop pins on the driven clutch member and the engaging surfaces of the solenoid armature or pawl;

Figure 5:
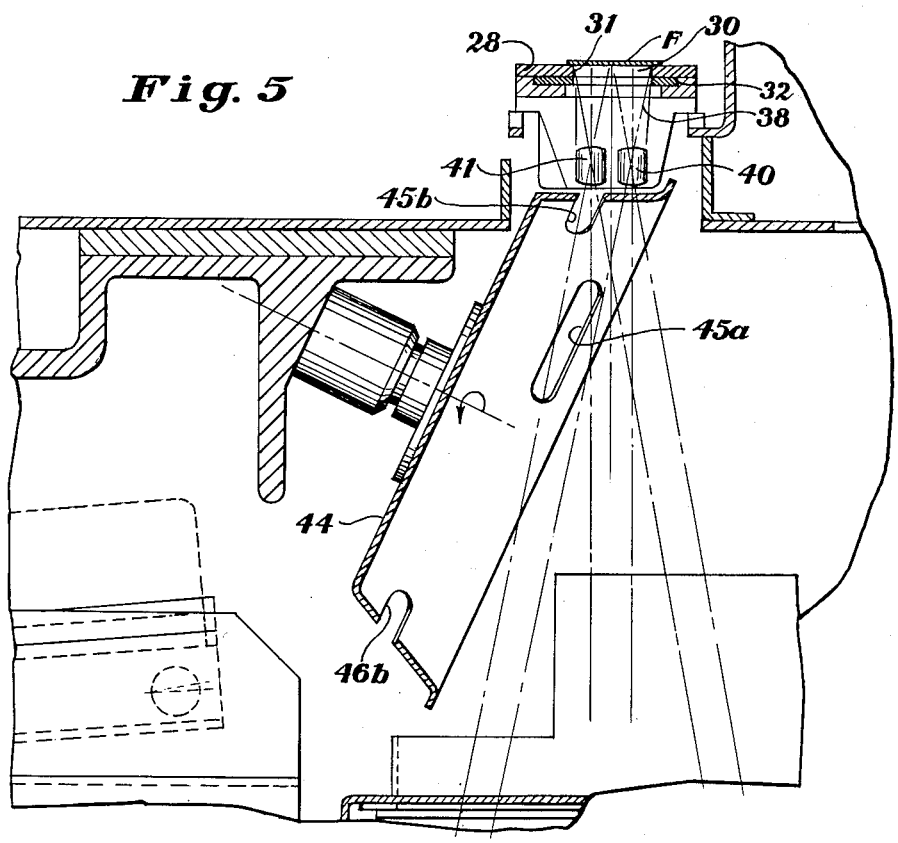
Fig. 5 is a partial vertical section showing the mutually offset objectives and the relation of the shutter apertures thereto.

The apparatus disclosed in Fig. 1 is similar to that described in the above-mentioned Hopkins patents. Such apparatus comprises a casing 10 provided with a front opening 11 and openings 12 in the side walls thereof, a top wall 13 and a base or copyholder 14 which has a document receiving or supporting area 15 arranged in the photographic field 16. Copy holder 14 has a top wall or surface 17 and recessed portion 18 which has a stationary abutment 19 at one end thereof against which the documents to be copied are arranged in a stack. A rear guide member 20 is slidably mounted in recess 18 and is connected to a continuous chain 21 so that the movement of said member is transmitted to sprocket 22 and chain 23 for a purpose to be more fully described hereinafter.

The copying camera 25 is mounted on cover 26 and, as disclosed in the above-mentioned Hopkins patents, has a supply and takeup compartment for the light-sensitive material or film F. The path of film F extends from the reel in the supply chamber around roller 27, through film gate 28, around film drive roller 29, and onto the reel in the take-up compartment. Film gate 28 defines the exposure station 30 for the film strip F and is provided with an aperture 31 and a mask 32 slidably mounted therein and provided with aperture 33 defining areas displaced laterally and longitudinally of the film gate as described more fully hereinafter. Platen 35 serves to maintain the film strip F in position on gate 28 and is carried by the bifurcated end of lever 36 which engages stud 37 and is eccentrically mounted on disc 38.

Figure 12:
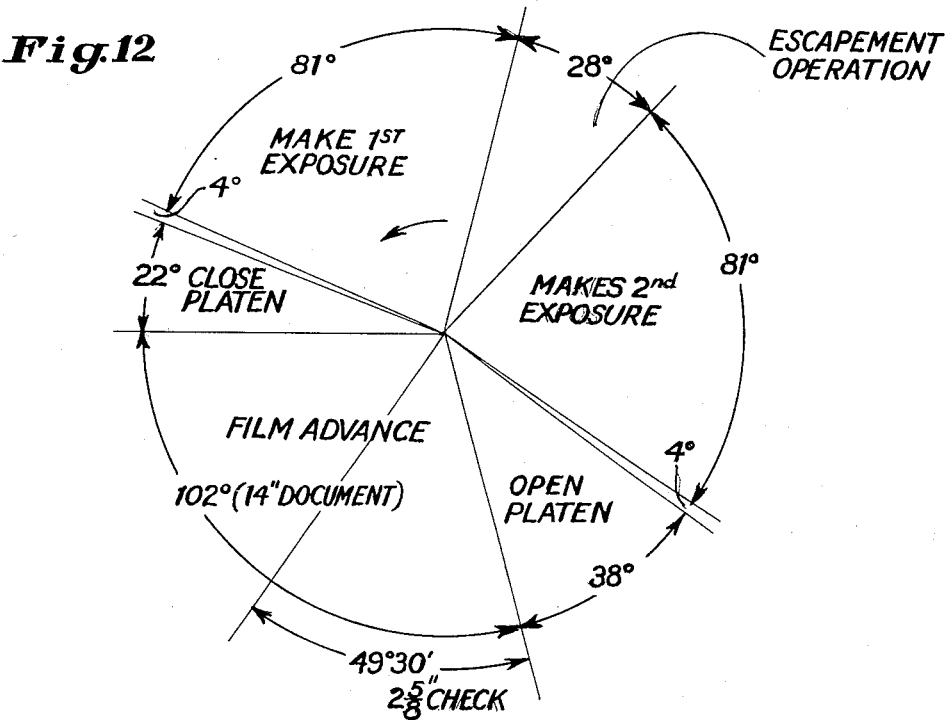
Fig. 12 is a diagram of the cycle of operation of the various elements for each revolution of the driven clutch member.

Objectives 40 and 41 are mounted below film gate 28, see Figs. 2 and 5, and are displaced both laterally and longitudinally of film strip F for imaging the different aspects of the documents in the displaced areas defined by the aperture 33 in mask 32. To photograph a plurality of checks so that the images of the obverse and reverse sides of the same check are spaced transversely of film F, as shown in Fig. 12, the operator first arranges the checks in a stack with the obverse side or face of the checks uppermost. The stack is then positioned in recess 18 adjacent abutment 19, as indicated at 42 in Fig. 1. The uppermost check on the stack is then positioned adjacent said stack to provide another stack area, as indicated at 43 in Fig. 1, member 20 being moved toward the rear edge of said stack to adjust mask 32, as described hereinafter. Consequently, with the exception of the first and last exposure, two checks are always arranged in the photographic field and each time a check is removed from the front stack, turned over, and transferred to the rear stack, a series of different aspects are presented. While objectives 40 and 41 are arranged to cover the same photographic field, the checks are imaged on different areas of the film strip in accordance with the lateral and longitudinal displacement of the objectives, and to obtain images of the obverse and reverse side of the same check transversely of the film F, the areas are displaced laterally of the film strip by a distance equal to the width of an area and longitudinally of the film strip by a distance equal to one-half the length of an area, the width remaining constant and the length varying in accordance with the position of member 20. A shutter 44 of conical shape, as shown in Figs. 2 and 5, is provided with two pairs of apertures, 45a and 45b and 46a and 46b, said apertures being diametrically opposite and each pair being displaced laterally and in the direction of movement so that an exposure can be made through only one objective at a time for successively exposing the areas to the different aspects presented.

The drive means comprises a motor 50 which through worm 51 and worm gear 52 rotates drive member 53 of clutch 54 thereby connecting the shutter drive and advancing means for the film to the drive means in the manner about to be described. Driven member 55 of clutch 54 is eccentrically mounted on shaft 57 and is rotated with member 53 through roller 58 retained between pins 59, see Figs. 3 and 4. Shaft 57 carries at one end thereof sprocket 60 and at the other end is coupled to shaft 61 on which is secured disc 62. The shutter driving means comprises sprocket 60, chain 63, sprocket 64, bevel gear 65 and bevel gear 66 on shutter shaft 67 so that upon rotation of shaft 57, shutter 44 is rotated. In the disclosed embodiment, the ratio of the drive connecting shaft 57 and shutter shaft 67 is 2:1 which accounts for the necessity of two pairs of apertures in shutter 44. If the ratio were 1:1, then only a single pair of apertures would be needed. In other words, the ratio of the drive between shafts 57 and 67 determines the number of pairs of apertures.

For intermittently advancing the film strip, the film advancing means comprises the disc 62, link 70 having one end eccentrically and pivotally secured at 90 to disc 62 and the other end pivotally connected at 91 to an arm 71 freely rotatable on stud 72, a pawl 73 having a pin 92 secured thereto, and a ratchet 74 which is secured to shaft 72 for rotating film drive roller 29 which is also secured to and rotatable with shaft 72. Pawl 73 is pivotally mounted on arm 71 at 75 and is biased by spring 76 toward ratchet 74. Between ratchet 74 and roller 29, a cam plate 77 having an actuating portion 78 is carried by stud 72 and is freely rotatable thereon. As disc 62 is rotated, the end of link 70 connected to arm 71 is oscillated in a vertical arcuate path, the spring 76 maintaining pawl 73 in contact with ratchet 74 for moving thereover as link 70 moves downward and engaging ratchet 74 to rotate it and the film drive roller 29 as link 70 moves upward. Since the cam plate 77 is in the plane of pin 92 on pawl 73, the actuating portion 78 serves to disengage pawl 73 from ratchet 74 upon contact with pin 92. The amount of film advanced, therefore, is determined by the lowermost position of pin 92 with respect to actuating portion 78 of cam plate 77, as shown in Fig. 6.

To vary the amount of film advanced, a link 79 is pivotally mounted at 80 to plate 77 and at 81 to a vertically extending link 82 pivotally mounted at 83. The link 82 is biased by a spring, not shown, in a direction to maintain pin 84 in engagement with cam 85 carried by shaft 86. Sprocket 87 which is also carried by shaft 86 is rotated by chain 23 which also encircles sprocket 22, see Figs. 1 and 2. A second link 88 which is also pivotally connected to arm 77 at 80 has its other end connected at 89 to mask 32. As described hereinbefore movement of guide member 20 is transmitted to sprocket 22 which through chain 23 rotates sprocket 87 and cam 85. Movement of cam 85 is transmitted through links 82 and 79 directly to plate 77 and through link 88 to mask 32, the drive and linkages providing a movement of mask 32 and plate 77 which is proportional to the reduction ratio of the optical system. Any variation in film advance or aperture size is controlled, therefore, by movement of guide member 20.

Platen 35 is raised or lowered by lever 93 which is eccentrically connected at 94 to disc 38 and provided with a roller 95 which engages link 70, the lever 93 being biased by a spring, not shown, toward link 70. Lever 93 is provided with a slot 96 which engages pin 97 so that upon movement of lever 70, which because of its eccentric mounting is oscillated both horizontally and vertically, lever 93 is oscillated in substantially a horizontal direction to rotate disc 38 and thereby raise or lower platen 35.

Figure 7:
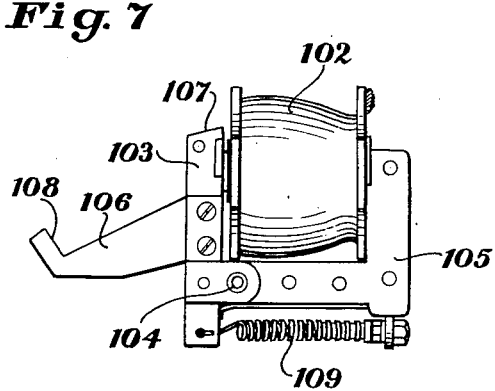
Fig. 7 is a detail view of the escapement solenoid and the pivotally mounted armature or double-action pawl.
Figure 4:
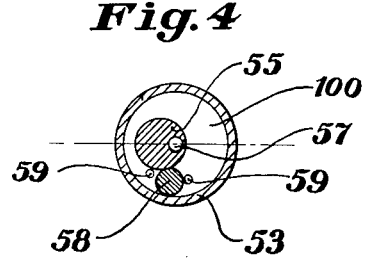
Fig. 4 is a sectional view taken substantially on line 4—4 of Fig. 3.

The escapement means for controlling the cycle of operation, as shown in Fig. 11, comprises a plate 100 integral with driven member 55, a pair of pins 101a and 101b extending from said plate and spaced circumferentially thereof, as shown in Figs. 8–11, a solenoid 102 having an armature 103 pivotally mounted at 104 on frame 105, and a retaining member 106 secured to said armature, see Figs. 2, 4, and 7. A spring 109 biases armature 103 and member 106 to a normal position, as shown in Fig. 6. The armature 103 and member 106 in effect comprise a double-action pawl which is actuated by the solenoid. In either case, the armature and retaining member are provided with engaging surfaces 107 and 108, respectively, which are arranged in the path of pins 101a and 101b. From Figs. 8–11 it will be noted that pins 101a and 101b are spaced circumferentially by a greater distance than are surfaces 107 and 108 for a reason to be explained hereinafter.

Figure 13:
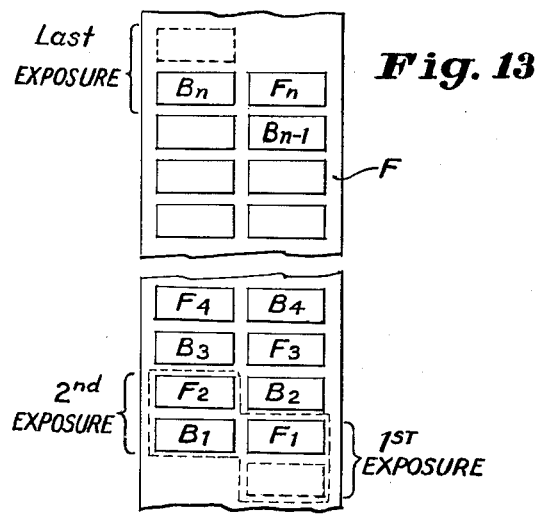
Fig. 13 is a view of a film strip exposed in the apparatus embodying the invention and showing the arrangement of the images of the obverse and reverse sides of the documents thereon.

Since the operator must transfer the uppermost check from the first stack to the second stack, an interval must be provided in which such changes in the aspects presented can be made. It is the function of the escapement means to control the cycle of operation by arresting clutch 54 at the proper time so that this operation may be performed. After the stack to be photographed has been arranged in position on copyholder 14 and stack areas 42 and 43 have been determined, the proper area of film to be masked and to be advanced has also been determined by the positioning of mask 32 and the actuating portion 78 of cam plate 77. If it is assumed that the pins 101a and 101b are in the positions as shown in Fig. 8 and the motor 50 and lamps, not shown, for illuminating said stack have been energized by closing of switch 110, then through worm 51 and worm gear 52 the drive member 53 is continuously rotated but driven member 55 is held against rotation by surfaces 107 and 108 in engagement with either pins 101a or 101b, as shown in Figs. 8–11. The operator must then depress both buttons 111 in order to close switches 112 which are arranged in series circuit. Since both hands must be used to depress the buttons, there is no possibility of the operator's hands being in the field of the objectives. Upon closure of switches 112, solenoid 102 is energized and armature 103 is moved toward the solenoid, thereby disengaging surface 107 from pin 101a and moving surface 108 into the path of said pin to arrest it as shown in Fig. 9. Upon release of pin 101a, the rotary motion of drive member 53 is transmitted to driven member 55 through roller 58 and shaft 57 is rotated. Rotation of shaft 57 is transmitted by chain 63 and gears 65 and 66 to shutter 44, thereby moving aperture 45a past objective 40 to expose the face of the uppermost check on the stack which is imaged on the film strip at F1, as shown in Fig. 13. At the same time, the rotation of shaft 57 is transmitted to shaft 61 and link 70 is moved downwardly with pawl 73 riding over ratchet 74. Movement of shutter 44 and link 70 is arrested when pin 101a engages surface 108 of member 106, as shown in Fig. 9. At this point shutter aperture 45a is to the left of objective 40, as viewed in Fig. 2, aperture 45b is to the right of objective 45b, and link 70 must still be moved downwardly. Upon releasing buttons 111, switches 112 return to their open position and solenoid 102 is de-energized, armature 103 and member 106 being returned to their normal position by spring 109, as shown in Fig. 10. This movement of the armature releases pin 101a from surface 108, positions surface 107 in the path of pin 101b and permits a slight rotation of shutter 44 and a small downward movement of link 70 and pawl 73. By spacing pins 101a and 101b farther apart than surfaces 107 and 108, surface 107 can release pin 101a and surface 108 can be positioned in the path of pin 101b before it has been moved past said surface. Also, in the event the operator merely touches buttons 111 to energize solenoid 102 so that it releases pin 101a, surface 108 will be removed from the path of pin 101a before it can reach said surface, however, surface 107 will have then been returned to its normal position so that pin 101b will arrest clutch 54 and the movement, as shown in Fig. 12, will include both the 81 degrees of exposure movement and the 28 degrees of escapement operation instead of being arrested first by pin 101a and then by pin 102b. The escapement means also prevents a double exposure of the same aspect in that the length of time the switches are held closed is immaterial because surface 108 is in the path of pin 101a and remains there until the buttons 111 are released.

With the completion of the first exposure, the operator then transfers the uppermost check face down to the stack area 43, thereby starting a second stack of checks which have the reverse side uppermost. The escapement parts are then in the position shown in Fig. 10. Upon depression of buttons 111, switches 112 are closed and solenoid 102 is again energized to move armature 103 and member 106 to the position shown in Fig. 11 wherein pin 101b is released from surface 107 and permitted to be moved into contact with surface 108. During this movement of pin 101b, driven member 55 and shaft 57 are rotated to move shutter aperture 45b past objective 41 and to move link 70 and pawl 73 downwardly to a position in which the pivot point is slightly past dead center. The back B1 of the first check and the front F2 of the second check are then imaged longitudinally of the film strip by lens 41 in an area displaced laterally by a distance substantially equal to the width of the area and longitudinally by a distance substantially equal to one-half the length of the area with the obverse and reverse images of the same document spaced transversely of the film strip as shown in Fig. 13. Since no check was in the first stack when the first exposure was made and no check will be in the second stack when the last exposure is made, only one check will be imaged for each of these two exposures. Upon release of buttons 111, armature 103 and member 106 will be returned to their normal position, surface 108 releasing pin 101b for movement and surface 107 being positioned in the path of pin 101a. Upon release of pin 101b and movement of said pins to the position shown in Fig. 8, the link 70 is moved upwardly with pawl 73 in engagement with ratchet 74 to rotate film drive roller 29. When pin 92 on pawl 73 engages actuating portion 78 on cam plate 77, the pawl is disengaged from the ratchet and movement of the film strip is terminated. As indicated in Fig. 10, the film advance interval is represented by 49°30′ to 102° of each revolution of shaft 57. As in the description of the first exposure, buttons 111 may be depressed only momentarily so that pin 101b is not stopped by member 106 and the rotation of shaft 57 is continuous until pin 101a engages surface 107. By maintaining the buttons 111 depressed, a double exposure cannot be made because surface 108 is maintained in the path of pin 101b. Upon completion of the second exposure and advancement of the film strip, shutter apertures 46a and 46b are then in the original positions of apertures 45a and 45b previous to the first exposure and the next set of exposures are then made through these apertures.

As link 70 is moved by disc 62, a horizontal as well as a vertical motion is imparted to said link and as previously described the upward vertical movement is utilized to advance the film strip. The horizontal component of its movement, however, is utilized to disengage platen 35 from the film strip, hold it in the disengaged position and return it to its normal position, the horizontal movement being transmitted to disc 38 by lever 93. As disclosed in Fig. 13, the film advance occurs after the platen has been opened, and the platen is closed before an exposure is made. Lever 115 which is pivotally mounted at 116 is located in the path of a pair of spaced pins 117 carried by disc 62, only one of said pins being shown in Figs. 2 and 6, for preventing retrograde movement of said disc upon engagement of pins 101a and 101b with either of surface 107 or 108. It is also to be understood that the pins 101a and 101b, armature 103 and member 106 may be in the position shown in Fig. 10 when the first exposure is to be made, however, when in this position the film is advanced after the first exposure but thereafter reverts to the regular cycle. After each depression of the buttons, therefore, the operator merely turns the uppermost check over and transfers it to the second stack, the exposure and film advance being automatically performed.

From the foregoing description, it is evident that intervals of the cycle are controlled by the escapement means so that the different aspects are imaged in successive displaced areas of the film strip, the images of the obverse and reverse sides of the same check being arranged in spaced-apart relation transversely of the film strip. Also, in the event that the operator does not release the buttons 111 instantly, or if the residual magnetism should cause a delay in the release of the armature 103, then the escapement provides a positive stop for the cycle and prevents any double exposures.

Since many other modifications of the disclosed embodiment of the invention may be suggested to those skilled in the art, the scope of the invention is pointed out in the appended claims.

Having now particularly described my invention, what I desire to secure by Letters Patent of the United States and what I claim is:

1. In a photographic copying apparatus having a photographic field and an exposure station for simultaneously recording on the same light-sensitive material the obverse side of one document and the reverse side of a second document, the combination with a copy holder for supporting documents in said photographic field, said documents being arranged in contiguous stacks for presenting a series of different aspects, and a gate member for supporting said light-sensitive material in said exposure station, of optical means arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures spaced laterally in accordance with said areas and in the direction of shutter movement for cooperating with said optical means to expose successively each different aspect, a drive means, advancing means for moving an amount of said light-sensitive material substantially equivalent to the length of said area past said exposure station, shutter driving means for moving said shutter means, clutch means operatively connecting said drive means to said advancing means and said shutter driving means for moving said light-sensitive material and said shutter means in synchronism, and an escapement means associated with said clutch means for providing a cycle of operation for each revolution of said clutch means in which said successive areas are exposed and said light-sensitive material is moved.

2. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, and a gate member for supporting light-sensitive material in said exposure station, of a pair of objectives arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one of said objectives at a time and of each different aspect, a drive means, advancing means for moving an amount of said light-sensitive material substantially equivalent to the length of said area past said exposure station, shutter driving means for moving said shutter means, clutch means operatively connecting said drive means to said advancing means and said shutter driving means for moving said light-sensitive material and said shutter means in synchronism, and an escapement means associated with said clutch means for arresting said clutch means after each exposure to permit different aspects to be presented and for providing a cycle of operation for each revolution of said clutch means including exposure through each objective and advancement of said light-sensitive material after exposure of different aspects have been made through each of said objectives.

3. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, a gate member for supporting light-sensitive material in said exposure station including a plate provided with an opening and including a masking member movable to vary the area of said opening, and a platen for maintaining said light-sensitive material on said gate member, of a pair of objectives arranged with respect to said light-sensitive material for imaging said different aspects of the document on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one objective at a time, a drive means, advancing means for moving an amount of said light-sensitive material substantially equivalent to the length of said area past said exposure station, means associated with said copy holder and operatively connected to said masking member and said advancing means for defining the length of said area on said copy holder and varying the opening in said film gate and the amount of light-sensitive material advanced in relation to said area defined on said copyholder, shutter driving means for moving said shutter means, means operatively connecting said platen and said advancing means for moving said platen to a position in which said platen is disengaged from said light-sensitive material prior to movement of said light-sensitive material and for maintaining said platen in said position during movement of said light-sensitive material, clutch means operatively connecting said drive means to said advancing means and said shutter driving means for moving said light-sensitive material and said shutter means in synchronism, and an escapement means associated with said clutch means for arresting said clutch means after each exposure to permit different aspects to be presented and for providing a cycle of operation for each revolution of said clutch means including exposure through each objective and advancement of said light-sensitive material after exposures of different aspects have been made through each of said objectives.

4. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, and a gate member for supporting light-sensitive material in said exposure station, of a pair of objectives arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one of said objectives at a time, a drive means, advancing means for moving an amount of said light-sensitive material substantially equivalent to the length of said area past said exposure station, shutter driving means for moving said shutter means, clutch means including a drive member operatively connected to said drive means and a driven member operatively connected to said shutter driving means and said advancing means for moving said shutter and light-sensitive material in a predetermined time relation upon each revolution of said driven member, an escapement means including a double-action pawl and a pair of stop members carried by said driven member and arranged thereon in spaced relation in the path of said pawl to provide a cycle of operation for each revolution of said driven member including exposure through each objective and advancement of said light-sensitive material after exposures of different aspects have been made through each of said objectives, said pawl being adapted to engage successively each stop member in either of two positions for arresting movement of said driven member, and an actuating means connected to said pawl for moving said pawl into position for successively releasing and engaging one of said stop members upon making each exposure of said different aspects.

5. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, and a gate member for supporting light-sensitive material in said exposure station, of a pair of objectives arranged with respect to said light-sensitive material for imaging said different aspects of the documents on successive displaced areas of said light-sensitive material, said areas being displaced laterally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one of said objectives at a time, a drive means, advancing means for moving an amount of said light-sensitive material substantially equivalent to the length of said area past said exposure station, shutter driving means for moving said shutter means, clutch means including a drive member operatively connected to said drive means and a driven member operatively connected to said shutter driving means and said advancing means for moving said shutter and light-sensitive material in a predetermined time relation upon each revolution of said driven member, an escapement means including a pivotally mounted pawl adapted to be moved between two positions and having two spaced engaging surfaces, and a pair of pins carried by said driven member and arranged thereon in spaced relation for engaging said surfaces successively to arrest said driven member, said escapement means providing a cycle of operation for each revolution of said driven member including exposure of different aspects through one of said objectives upon movement of each pin between said surfaces and advancement of said light-sensitive material upon movement of said pins without said surfaces, resilient means for maintaining said pawl in one of said two positions with one of said surfaces in engagement with one of said pins for maintaining said driven member inoperative, and an actuating means including a solenoid adapted upon energization thereof to move said pawl into the other of said two positions for releasing said pin from said one surface to permit rotation of said driven member until said same pin engages said other surface.

6. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, and a gate member for supporting light-sensitive material in said exposure station, of a pair of objectives arranged with respect to said light-sensitive material for imaging said different aspects of the documents on successive displaced areas of said light-sensitive material, said areas being displaced laterally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one of said objectives at a time, a drive means, advancing means for moving an amount of said light-sensitive material substantially equivalent to the length of said area past said exposure station, shutter driving means for moving said shutter means, clutch means including a drive member operatively connected to said drive means and a driven member operatively connected to said shutter driving means and said advancing means for moving said shutter and light-sensitive material in a predetermined time relation upon each revolution of said driven member, an escapement means including a pivotally mounted pawl adapted to be moved between two positions and having a first engaging surface movable from a holding position to a releasing position and a second engaging surface spaced from said first surface and movable from a releasing position to a holding position and a pair of pins carried by said driven member and arranged thereon in a spaced relation greater than the spacing between said surfaces for engaging said surfaces successively to arrest said driven member, said escapement means providing a cycle of operation for each revolution of said driven member including exposure of said different aspects through one of said objectives upon movement of each pin between said first and second surfaces and advancement of said light-sensitive material upon movement of said pins between said second and first surfaces, resilient means for maintaining said pawl in one of said two positions in which said first surface is in engagement with one of said pins for maintaining said driven member inoperative, and an actuating means including a solenoid adapted upon energization thereof to move said pawl to the other of said positions for releasing said engaged pin to render said driven member operative and for positioning said second surface in the path of said same pin to render said driven member inoperative.

7. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, and a gate member for supporting light-sensitive material in said exposure station, of a pair of objectives arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of shutter movement and adapted to be moved past said objectives for making an exposure through only one of said objectives at a time, a drive means, advancing means for moving an amount of said light-sensitive material substantially equivalent to the length of said area past said exposure station, shutter driving means for moving said shutter means, an escapement means including a solenoid having a pivotally mounted armature provided with an engaging surface, an arresting member carried by said armature and having an engaging surface spaced from said first-mentioned surface and a pair of pins carried by said driven member and arranged thereon in a spaced relation greater than the spacing between said surfaces for engaging said surfaces successively to arrest said driven member, said escapement means providing a cycle of operation for each revolution of said driven member including exposure of said different aspects through one of said objectives upon movement of each pin between said engaging surfaces and advancement of said light-sensitive material upon movement of said pins between the surface of said arresting member and the surface of said armature, and manually operable switch means for initiating energization of said solenoid to move said armature and member to a position in which the engaging surface of said armature is withdrawn from the path of the pin engaged thereby for rendering the driven member operative and the engaging surface of the arresting member is moved into the path of said same pin for rendering said driven member inoperative.

8. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, a gate member for supporting light-sensitive material in said exposure station including a plate provided with an opening and including a masking member movable to vary the area of said opening, a platen for maintaining said light-sensitive material on said gate member, of a pair of objectives arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of movement and adapted to be moved past said objectives for making an exposure through only one objective at a time, a drive means, advancing means for moving an amount of said light-sensitive material substantially equivalent to the length of said area past said exposure station, means associated with said copy holder and operatively connected to said masking member and said advancing means for defining the length of said area on said copy holder and varying the opening in said film gate and the amount of light-sensitive material advanced in relation to said area defined on said copyholder, shutter driving means for moving said shutter means, means operatively connecting said platen and said advancing means for moving said platen to a position in which said platen is disengaged from said light-sensitive material prior to movement of said light-sensitive material and for maintaining said platen in said position during movement of said light-sensitive material, clutch means including a drive member operatively connected to said drive means and a driven member operatively connected to said shutter driving means and said advancing means for moving said shutter and light-sensitive material in a predetermined time relation upon each revolution of said driven member, and escapement means including a double-action pawl and a pair of stop members carried by said driven member and arranged thereon in spaced relation in the path of said pawl to provide a cycle of operation for each revolution of said driven member including exposure through each objective and advancement of said light-sensitive material after exposure of different aspects have been made through each of said objectives, said pawl being adapted to engage successively each stop member in either of two positions for arresting movement of said driven member, and an actuating means connected to said pawl for moving said pawl into position for successively releasing and engaging one of said stop members upon making each exposure of said different aspects.

9. In a photographic copying apparatus having a photographic field and an exposure station for simultaneously recording the obverse side of one document and the reverse side of a second document, the combination with a copy holder for supporting documents in said photographic field, said documents being arranged in contiguous stacks for presenting a series of different aspects, a gate member for supporting light-sensitive material in said exposure station including a plate provided with an opening and including a masking member movable to vary the area of said opening, a platen for maintaining said light-sensitive material on said gate member, of a pair of objectives arranged with respect to said light-sensitive material for imaging said different aspects of the documents on successive displaced areas of said light-sensitive material, said areas being displaced laterally by a distance substantially equal to the width of an area and longitudinally by a distance substantially equal to one-half the length of an area so that the images of the obverse and reverse sides of each document are adjacent transversely of said light-sensitive material, shutter means provided with apertures displaced laterally in accordance with the lateral spacing of said objectives and in the direction of movement and adapted to be moved past said objectives for making an exposure through only one objective at a time, a drive means, advancing means for moving an amount of said light-sensitive material substantially equivalent to the length of said area past said exposure station, means associated with said copy holder and operatively connected to said masking member and said advancing means for defining the length of said area on said copy holder and varying the opening in said film gate and the amount of light-sensitive material advanced in relation to said area defined on said copy holder, shutter driving means for moving said shutter means, means operatively connecting said platen and said advancing means for moving said platen to a position in which said platen is disengaged from said light-sensitive material, an escapement means including a solenoid having a pivotally mounted armature provided with an engaging surface, an arresting member carried by said armature and having an engaging surface spaced from said first-mentioned surface and a pair of pins carried by said driven member and arranged thereon in a spaced relation greater than the spacing between said surfaces for engaging said surfaces successively to arrest said driven member, said escapement means providing a cycle of operation for each revolution of said driven member including exposure of different aspects successively through each of said objectives upon movement of each pin between said engaging surfaces and advancement of said light-sensitive material upon movement of said pins between the surface of said arresting member and the surface of said armature, and manually operable switch means for initiating energization of said solenoid to move said armature and member to a position in which the engaging surface of said armature is withdrawn from the path of the pin engaged thereby for rendering the driven member operative and the engaging surface of the arresting member is moved into the path of said same pin for rendering said driven member inoperative.

GEORGE W. SCHNETZER, JR.

References Cited in the file of this patent
UNITED STATES PATENTS

| Number | Name | Date |
| --- | --- | --- |
| 2,548,769 | Debrie | Jan. 11, 1949 |